Jan. 3, 1956  J. F. DEWHIRST  2,729,806
IDLING PERIOD SIGNALLING AND STOPPING
DEVICE FOR MOTOR VEHICLE ENGINES
Filed Sept. 27, 1954
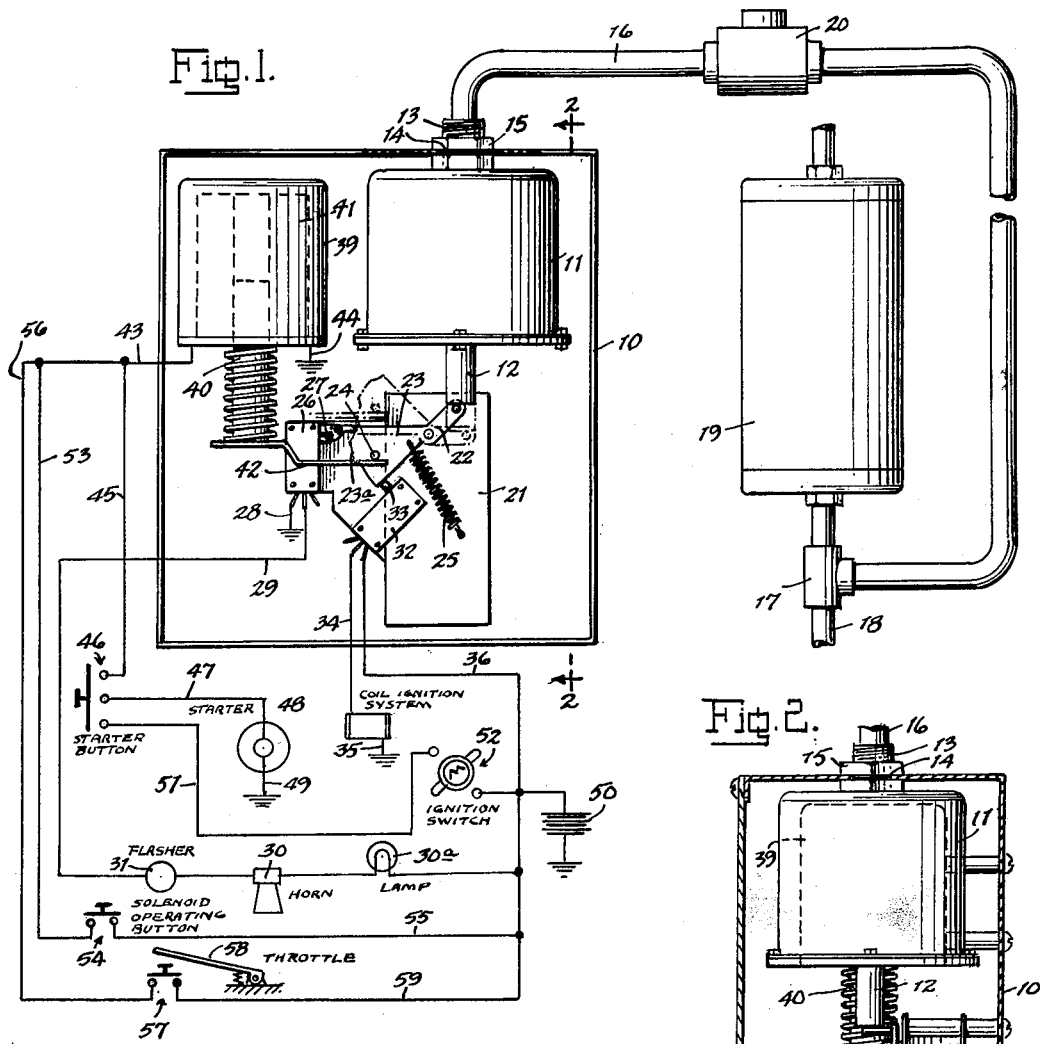
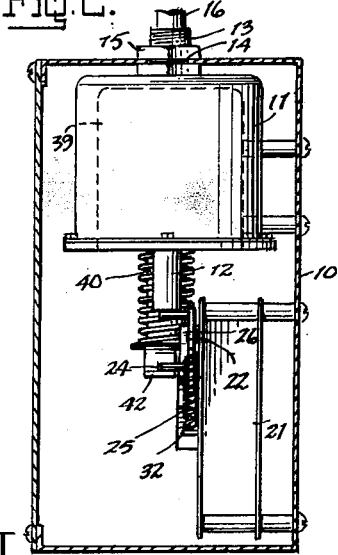
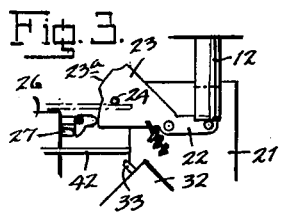
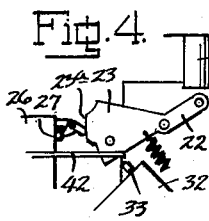
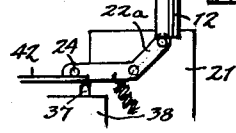
Inventor
JOSEPH F. DEWHIRST
By
Attorney

United States Patent Office 2,729,806
Patented Jan. 3, 1956

2,729,806

IDLING PERIOD SIGNALLING AND STOPPING DEVICE FOR MOTOR VEHICLE ENGINES

Joseph F. Dewhirst, Bridgeport, Conn.

Application September 27, 1954, Serial No. 458,331

3 Claims. (Cl. 340—52)

The present invention relates to a device for automatically rendering a signal in a motor vehicle after a predetermined stationary period during which the engine is running, and more particularly to such a device which will automatically shut off the engine subsequent to the rendering of such a signal.

An object of the present invention is to provide a device for use in motor vehicles which will render a signal either audible or visible, or both, when the vehicle remains stationary for a predetermined period and the engine is running. Thus if a motor vehicle having the device of the present invention installed therein were left idling by the operator, after a predetermined period a signal would be rendered and, if within hearing and/or viewing, he would be given notice of the excessive idling. The rendering of the signal would be particularly useful in door-to-door delivery trucks as, for instance, milk trucks, where the device could be so installed as not to render a signal during the normal period of stopping, for example, two minutes, but should the driver be away from the vehicle for an extended period, the signal would then be rendered calling him back to the truck.

Another object is to provide such a device which upon excessive idling will first cause the rendering of a signal and which will subsequently cause the engine to be shut off in the event the driver fails to return to the vehicle upon the rendering of said signal.

A further object is to provide such a device in a motor vehicle and additionally to provide means for by-passing its operation in the event its use on occasion should be deemed to be undesirable.

Another object is to provide such a device which is actuated by the oil pressure lubricating system and which, in addition to rendering a signal aimed at avoiding excessive idling, may function to give notice of faulty lubrication.

A still further object is to provide such a device which is actuated by the motion and lack of motion of the vehicle in which it is installed, while a still further object is to provide such a device which produces a savings in gas as well as wear and detriment to the engine, associated battery and other operating parts from overheating and the like.

According to the present invention a control device is provided for rendering a signal in a motor vehicle, after a predetermined stationary period, and comprises timer means having a predetermined operation period, means for actuating the timer means substantially at the commencement of the idling period, means for resetting the said timer means, and means adapted to commence the rendering of a signal at the end of said operating period of the said timer means. The signal rendered may be visible and audible, or either one, independent of the other.

In addition the device may be provided with means connected to an electric starter circuit for shutting off the engine as well as and preferably subsequent to the rendering of a signal. This may be accomplished by operatively positioning in the device either a single timer switch having two internal timers or a pair of timer switches acted upon by a suitable common contact member operatively connected to the timer means.

As used in the specification, the term "stationary period" is intended to include vehicles which have come to rest and in which their engines are idling or not idling, depending upon the class of vehicle and engine employed.

The means for actuating the timer means, i. e., which commences the running of its cycles, may either be dependent upon the cessation of motion of the vehicle or the usual consequence of such cessation as, for instance, falling oil pressure in a vehicle engine having an oil pressure lubrication system. A system illustrative of the first type is to be found in my U. S. Patent No. 2,652,125 issued September 15, 1953. In this system the motion of the vehicle causes a mercury switch to maintain a closed circuit which in turn energized a solenoid which maintained the timer means in a reset position. When the vehicle ceased moving the mercury switch was thereby caused to open the circuit to the solenoid, thus actuating the timer means which at the end of a predetermined period caused a timer switch to open the starter circuit thus shutting off the engine.

A system illustrating the second type of means for actuating the timer means is to be found in my U. S. Patent No. 2,580,082 issued December 25, 1951, in which the timer means was actuated to commence its cycle by falling oil pressure in an engine in which idling results in falling oil pressure, which for practical purposes includes most internal combustion engines. It should be noted that although generally speaking idling occurs while a vehicle is stationary, such is not always the case as, for instance, in the case of a vehicle on an extended grade where the operator may not utilize the throttle and may take the engine out of gear. In the system of my patent in which changes in oil pressure activate the timer means, it will be noted that increases in oil pressure will wind or reset the timing device and decreases below a certain point will cause the predetermined unwinding period of the device to begin. At the end of the period the timer switch is opened which is suitably connected to the ignition system, so that the ignition system is open and the engine is shut off. In addition it should be noted that in the present invention where the actuating of the timer means is achieved by the falling of oil pressure, the operator will be given notice of low oil pressure by the rendering of a signal, which may subsequently be followed by shutting off of the engine.

The above means of activating the timer means are illustrative of those that may be employed in the practice of the present invention.

Other objects and advantages of the invention will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 1 is a front elevation of one embodiment of the invention, partially broken away, and showing schematically the electrical connection with the starter and ignition system;

Fig. 2 is a vertical sectional view taken along the line 2—2 of Fig. 1;

Figs. 3, 4 and 5 are front views, portions of which are broken away, illustrating in detail the operative relationship between the timer means and the switches, and the stages of the timing cycle;

Fig. 6 is a front view, portions of which are broken away, of an optional embodiment illustrating only a single switch connected to an audible signal, and in broken lines the progress of the switch contacting arm during the operating cycle of the timer.

Referring to the drawings, the main control parts of the device are contained in a box 10 of generally rectangular form and preferably constructed of metal, provided with a hinged cover or the like (not shown) so that access to the control parts may be had. Upon one wall of the container there is mounted an oil pressure operated unit 11, such as the type which employs a bellows within (not shown) and a plunger 12 at one end thereof adapted to be projected when a predetermined oil pressure exists within the bellows. The oil pressure operated unit is provided with a threaded stud 13 engaged through a hole 14 in the wall of the container, and secured therein by a nut 15, the stud having connected thereto the end of an oil pressure supply pipe 16 connected by union 17 at a suitable point in the oil line of the engine shown in the illustration of the invention as the tube 18 connected to the oil filter 19.

Within the supply pipe 16 there is provided a pressure regulator 20 adapted to be adjusted so as to reduce whatever idling oil pressure exists, in a particular engine to the requirements of the bellows, thus making the device adaptable to widely different conditions. Thus, if the bellows is adapted to operate at pressures in excess of six pounds, the regulator may be adjusted so as to deliver six pounds pressure to the bellows when the oil pressure is either above or below this amount. Thus the device may be adapted for use with an engine where the idling oil pressure may be as much as fifteen pounds, as well as to an engine where the idling pressure is as low as three or four pounds.

Within the container 10 there is also mounted a timer unit 21 having a pivoted reset arm 22 having an enlarged triangle shaped portion 23 which has a cam 23a on the outside edge thereof. A stud 24 projects outwardly from the face of portion 23 adjacent to its upper inwardly tapered edge.

Attached to the pivot reset arm and the forward surface of the timer unit is a spring 25 of such construction as to provide a steady downward pull or pressure on the reset arm.

Immediately adjacent to the outside edge of portion 23 of the pivot reset arm is a normally open one-way switch 26 having a switch button 27 on one of its side edges. By a one-way switch is meant a switch which will close a circuit when contacted from one side but will not, when contacted from another. Lead 28 properly grounds said switch and lead 29 is connected into a circuit which includes signal rendering devices, horn 30 and light 30a, and also includes a flasher 31 which will provide for intermittent rendition of the signals.

Positioned below the pivot reset arm and fastened to the timer mechanism case is a normally closed switch 32 having a switch button 33. Lead 34 properly connects the switch into a conventional coil ignition system which is grounded at 35, while lead 36 connects the switch into the ignition circuit. For the purpose of the present invention it is only necessary that the switch 32 have sufficient capacity to carry ignition without affecting operation of the engine, and that it be able to stand heavy use.

As illustrated in Fig. 1 in solid lines, the pivot reset arm is in the normal position, the lower edge of portion 23 thereof being in contact with the switch button 33 which opens the switch 32 shutting off the ignition circuit and thus the engine. Shown in dotted lines is the reset position, in which position the switch is closed as is the ignition circuit.

The timer is preferably adjustable so that the timing period required for the movement of the arm from its reset to the normal position may be varied as desired.

Timer devices of this type are well known, being used on automatic washers, toasters, industrial applications, kitchen timers, etc., so that a detailed illustration or discussion of the timing mechanism is deemed unnecessary.

In the operation of the present control device, as more clearly illustrated in Figs. 3–5, the oil pressure operated unit when the oil pressure is to the required height, causes the plunger 12 at one end thereof to be moved downwardly thereby winding or resetting the timer device for a predetermined operating period, for example, four and one-half minutes. Upon idling the engine the oil pressure is lessened thereby withdrawing the plunger and permitting the force of the downwardly pulling spring 25 to become effective. As the portion 23 of the reset arm commences the movement to the normal position through the predetermined timing cycle, at the end of a predetermined period within the four and one-half minute cycle, say two and one-half minutes, cam 23a contacts and depresses switch button 27 of one-way switch 26. This results in the sounding of horn 30 and the lighting of light 30a by closing the circuit to the horn and light through lead 29. While both the sounding of the horn and the lighting of the light are shown, it will be understood that either of the two may be used alone depending upon the requirements of the device. While the cam is passing over the switch button which may be for a period of a minute, the horn could be sounded continuously and the light continuously lit. However, because of the nuisance caused by such sounding of the horn, flasher 31 is connected into the circuit. The flasher is set to permit three second soundings and flashings with fifteen seconds intermissions, or any other suitable arrangement. This overcomes objections to excessive noise and at the same time achieves its function of warning the operator of excessive idling.

When the cam has passed over the switch button another predetermined period, for instance one minute, within the original period elapses before the lower edge of portion 23 contacts switch button 33, which opens switch 32 cutting off the ignition by opening the circuit through lead 36. Thus if the driver fails to respond to the audible and/or visible signal by returning to the truck to either continue on his way or shut off the engine, it will automatically be shut off a short time later.

In the event that only a horn warning system or only a visible signal is desirable, only a single switch need be employed as shown in Fig. 6, where a time-controlled pivot reset arm 22a is arranged to contact with switch button 37 of switch 38 which is suitably connected into the audible or visible signal circuit, as illustrated in Fig. 1. In this embodiment, providing there is a flasher in the circuit, a continuous intermittent sounding of the horn or flashing of the light would result until the operator returned to the vehicle to continue on his way or shut off the engine.

While the engine is idling the oil pressure generally speaking will be low. Any increase in the speed of the engine such as by putting the vehicle in motion, is normally sufficient to cause considerable increase in the oil pressure and thus cause the plunger from the oil pressure unit to be projected and thereby reset the timer.

In order to close the ignition system upon starting the engine and before the oil pressure of the engine is raised to the point where it will take over the automatic operation of the device, a solenoid 39 is provided in the box 10 and has its spring-biased core 40, energizing coils 41, and an arm 42 extending from the core laterally to and beneath the stud 24, on portion 23 of the reset arm. The solenoid is connected by lead 43 to the starter circuit and is grounded at its other side as at 44. The lead 43 is connected by lead 45 to the first contact of a three contact starter button or switch 46, a lead 47 extending from the second contact to one side of a starter 48 which is grounded at its other side as at 49. The starter circuit is completed to the battery 50 by a lead 51 extending from the third contact of the starter button through the ignition switch 52 to the battery. Thus when the starter button is pressed to operate the starter the solenoid is simultaneously energized to thereby pull the reset lever into the dotted line position to close switch 32 and thus closing the circuit of the ignition system, the ignition switch 52 having previously been closed as a preliminary to the starting operation.

Since a system as above described is dependent upon oil pressure and provides for not only rendering a signal and cutting off of an engine during times when oil pressure is normally low but also for giving warning of low oil pressure, which may be signs of faulty lubrication, etc., there may be times as in emergencies when it would be important to by-pass the system above described. For such purposes, lead 43 extending from the solenoid may have a lead 53 extending therefrom to one contact of a two contact switch 54, lead 55 extending from the other contact to the battery. Thus by simply depressing or closing the contact switch the solenoid would be energized maintaining the pivot reset arm in the reset position, regardless of what the oil pressure might be.

The same result is achieved by a lead 56 extending from lead 43 to one end contact of a two contact switch 57 positioned beneath the throttle 58, lead 59 extending from the other contact to the battery. By this arrangement the timer is maintained in the reset position by depressing the throttle, regardless of what the oil pressure might be and whether the vehicle is idling or not.

The invention may be used in connection with a diesel or other type engine not having an electric ignition circuit, in which case a separate electric circuit may be provided for the signal means, in the case of the signal means being of an electrically operated type.

It will be understood that the electrical circuits may include relays, transformers and other suitable elements in accordance with well known electrical engineering practice.

What is claimed is:

1. A control device for rendering a signal in a motor vehicle after a predetermined stationary period and for stopping the engine after a predetermined stationary period, said engine having an electrical starter circuit therein and an oil pressure lubricating system comprising oil pressure actuated means adapted to be connected to the oil pressure lubricating system and movable between relatively low and high oil pressure positions, timer means having a predetermined operating period, said oil pressure actuated means actuating said timer means substantially at the commencement of the stationary period, reset means arranged to be actuated to reset position by movement of said oil pressure actuated means into high oil pressure position, and means adapted to be operatively connected to said electrical circuit to render a signal at the end of a predetermined operating period of said timer means, means adapted to be operatively connected to said electrical circuit to stop the engine subsequent to the rendering of said signal, and means arranged to actuate said reset means independently of said oil pressure actuated means.

2. A control device for rendering a signal in a motor vehicle after a predetermined stationary period and for stopping the engine after a predetermined stationary period, said engine having an electrical circuit to control the stopping of the engine and an oil pressure lubricating system comprising oil pressure actuated means adapted to be connected to the oil pressure lubricating system and movable between relatively high and low oil pressure positions, timer means having a predetermined operating period, said oil pressure actuated means actuating said timer means substantially at the commencement of the stationary period, reset means arranged to be actuated to reset position by movement of said oil pressure actuated means into high oil pressure position, an electrical circuit including a signal operating switch, a signal operative upon closing said signal switch, said closing being achieved by means operatively connected to the timer means, a second switch arranged to be operated by said timer means, successively following the closing of said first switch, said second switch being arranged in the electrical control circuit, the opening of which opens the control circuit thereby shutting off the engine.

3. A control device for rendering a signal in a motor vehicle after a predetermined stationary period and for stopping the engine after a predetermined stationary period, said engine having an electrical circuit to an audible signal and a starter circuit and oil pressure lubricating system comprising oil pressure actuated means adapted to be connected to the oil pressure lubricating system and movable between relatively low and high oil pressure positions, timer means having a predetermined operating period, said oil pressure actuated means actuating said timer means substantially at the commencement of the stationary period, reset means arranged to be actuated to reset position by movement of said oil pressure actuated means into high oil pressure position, and a switch adapted to be interposed in said signal circuit the closing of which renders a signal, said closing being achieved by means operatively connected to the timer means which means provide means for subsequently opening said switch to thereby end the rendering of said signal, means operatively connected to the timer means for shutting off the engine subsequent to the rendering of a signal, and means for resetting the timer means independent of the oil lubricating system.

References Cited in the file of this patent

UNITED STATES PATENTS

| | | |
|---|---|---|
| 2,294,830 | Brown | Sept. 1, 1942 |
| 2,339,532 | Venable | Jan. 18, 1944 |
| 2,603,697 | Korte | July 15, 1952 |
| 2,645,763 | Heehler | July 14, 1953 |
| 2,676,315 | Kyle | Apr. 20, 1954 |